March 23, 1954 R. BERNHARDT 2,672,741
ROTATABLE TABLE CASTER
Filed Nov. 6, 1952 2 Sheets-Sheet 1

Inventor:
Rudolph Bernhardt
By Glenn S. Noble
Atty.

March 23, 1954
R. BERNHARDT
2,672,741
ROTATABLE TABLE CASTER
Filed Nov. 6, 1952
2 Sheets-Sheet 2
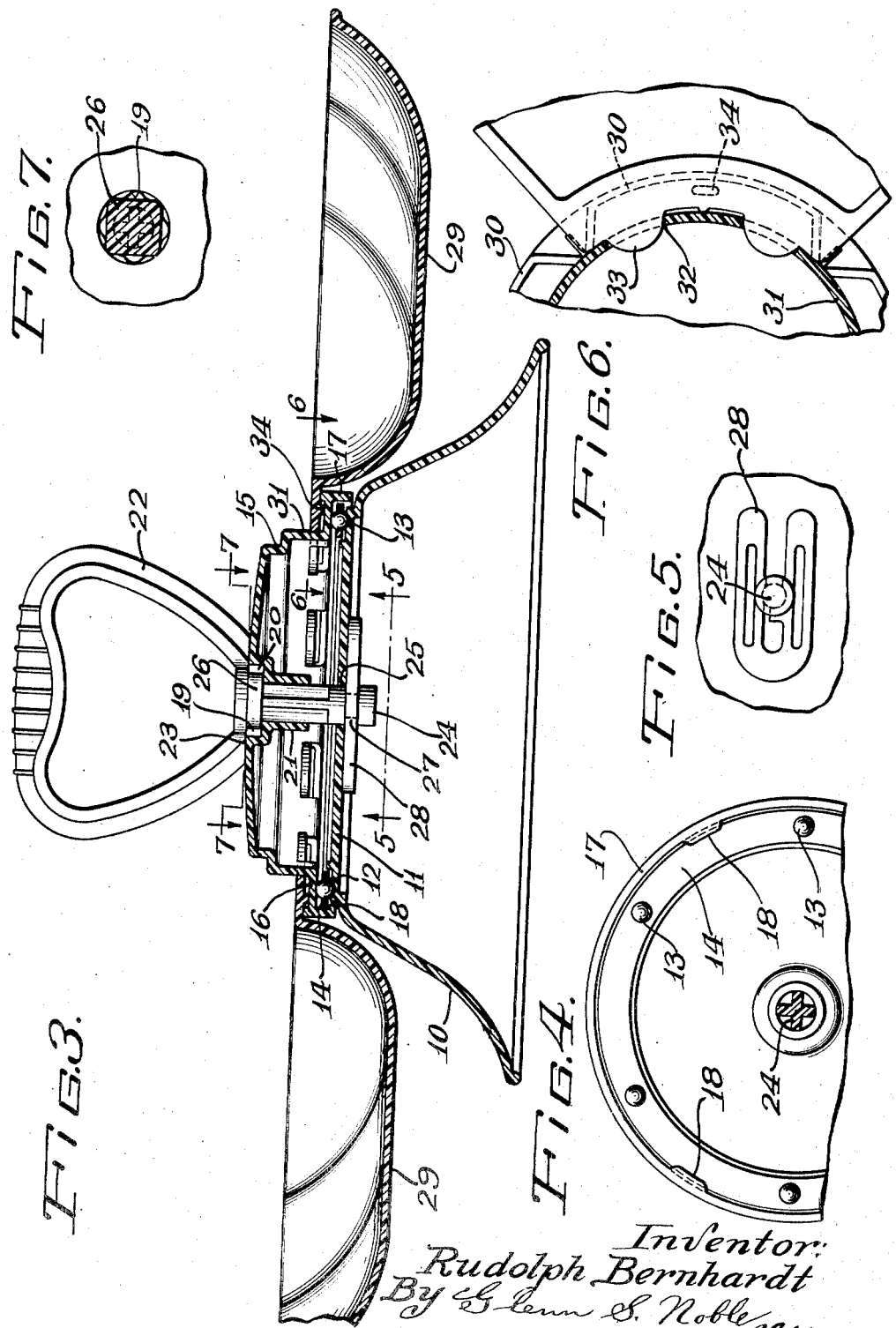
Inventor:
Rudolph Bernhardt
By Glenn S. Noble
Atty.

Patented Mar. 23, 1954

2,672,741

UNITED STATES PATENT OFFICE 2,672,741

ROTATABLE TABLE CASTER

Rudolph Bernhardt, Chicago, Ill.

Application November 6, 1952, Serial No. 319,131

3 Claims. (Cl. 65—55)

This invention relates to portable service apparatus or casters particularly of the kind having rotatable holders for condiments and/or other comestibles.

Among the objects of the invention are to provide an apparatus of this kind in which all of the parts except the ball bearings are molded of suitable plastic material; to provide an article of this kind which will be particularly pleasing in appearance and which may be readily cleaned after use; to provide a knock-down caster having the parts arranged so that they may be conveniently assembled in a box for shipment; and to provide such other advantages and improvements as will appear more fully from the following description taken in connection with the accompanying drawings in which, Fig. 1 is a plan view of my improved apparatus;

Fig. 3 is an enlarged sectional view taken substantially on the line 3—3 of Fig. 1;

Fig. 4 is an inverted sectional plan view showing the anti-friction ball bearing;

Fig. 5 is a detail of the slip locking clip or fastener;

Fig. 6 is a sectional detail taken substantially on the line 6—6 of Fig. 3; and

Fig. 7 is a sectional detail taken on the line 7—7 of Fig. 3.

Figure 1:
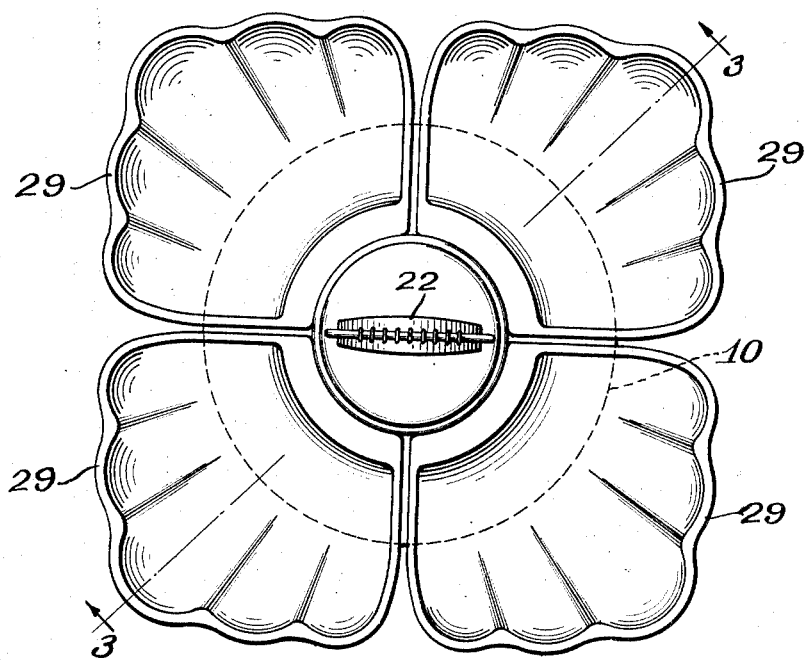
Figure 2:
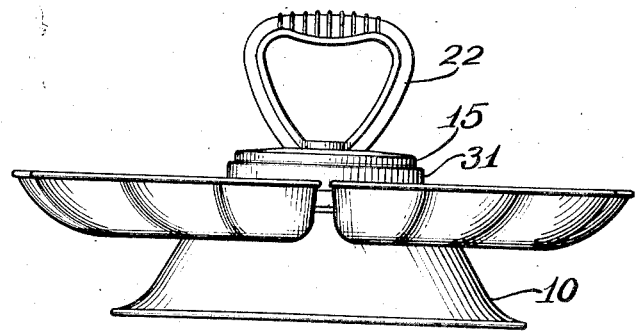
Fig. 2 is a side view.

Although the caster may be made of any desired size, in a preferred form now on the market, it is approximately 9½ inches across and 5 inches high and the parts are made of proper cross section for convenience in molding.

As shown in these drawings, 10 is a base of the shape shown and having a flat circular top 11. The upper surface of the top has a ball race 12 for receiving the balls 13 of a ball bearing. These balls are mounted in a flat cage 14 and form a bearing for the cap or turn table 15. This turn table is of inverted-pan shape and has an annular flat peripheral portion or ledge 16 which rests on the balls 13 and has a downwardly extending peripheral flange 17 which encloses the ball bearing, this flange being provided with inwardly projecting lugs 18 for engaging and holding the ball cage in position in the cap.

The top wall or crown of the cap 15 has a central depression 19 having a polygonal shaped periphery 20 and a downwardly extending cylindrical bearing sleeve 21. A handle 22 preferably of loop shape has a flat lower surface 23 which rests on the top of the cap and is provided with a stem 24 which extends down through the bearing 21 and through a hole 25 in the top of the base. The handle also has a short polygonal shaped boss 26 which fits in the polygonal shaped depression in the cap and serves to key the cap to the turn table. The stem 24 has an annular groove 27 for receiving a locking clip or fastener 28 shaped somewhat in the form of a clothespin as shown in Fig. 5, and adapted to spring over the reduced portion of the pin and hold all of the parts together.

A plurality of comestible receiving trays or receptacles 29 are detachably secured to the turn table and any number of trays may be used but in the present instance I have shown four of such trays which are preferably made in ornamental shapes and approximately rectangular, thus making the general outline of the completed apparatus also substantially rectangular. When the trays are in position, it will be noted that the dividing lines between them will be radial. These trays are detachably secured to the turn table by means best shown in Figs. 3 and 6. The peripheral portion 16 of the turn table is provided with four upwardly projecting ribs 30, the side portion of these ribs being parallel and connected by peripheral portions as shown. The sides 31 of the cap are provided with two slots 32 opposed to each of the several ribs 30. These slots are engaged by lugs or projections 33 on the inner peripheries of the several trays. Each tray is provided with a downwardly extending lug or protuberance 34 which is adapted to take over the outer rim portion of the rib 30 in order to hold the tray in position. When the trays or dishes 29 are to be attached, they are inserted at a slight angle so that the lug 34 will pass inwardly over the rib 30 as the projections 33 are being inserted in the slots; then when the lug has passed the rib, the outward portion of the tray is slightly lowered and the lug locks the tray against outward movement, it being understood that there is a fairly close fit between the projections 33 and the slots for receiving the same.

When the several parts have been assembled as shown in Fig. 3, the locking clip 22 is slipped over the groove in the pin 24, there being sufficient resiliency to permit the clip to be shoved into holding position as shown. From this it will be seen that there are no threaded or complicated parts and the entire device is easily cleaned. It will also be noted that the lazy susan can be easily knocked down in order to place the same in a carton for shipment.

When the device is placed on a table for use, any edibles may be placed in the several trays or they may be used for holding cruets or condiments, or the like.

Having thus described my invention, what I claim is:

1. In a device of the character set forth, the combination of a bell-shaped base having a flat top, a cap having an annular flange fitting over the top, ball bearings between the cap and the top, said cap having a central downwardly extending bearing, a handle having a stem projecting down through the bearing and having interengaging means for turning the cap, said stem extending through a hole in the top of the base, a spring clip engaging with a groove in the stem and with the lower surface of the top for holding the parts together, said cap having an outwardly extending rim portion with a plurality of upwardly extending ribs, each rib having a peripheral portion and having parallel sides, slots in the cap between said side portions, trays having substantially semi-circular lugs adapted to engage closely with pairs of said slots, each tray having a projection adapted to engage with the peripheral portion of the corresponding rib for holding the tray in position, the trays being sufficiently flexible to permit them to be assembled with the lugs within the ribs.

2. A readily knocked-down and assembled table caster, comprising a base member having a horizontal top wall provided with a central aperture; a cap member rotatably superposed upon said base member and provided with a bearing sleeve alined with said base member aperture; said cap member having a horizontal peripheral portion disposed in vertically spaced relation to said top wall of the base member and provided with a depending annular flange having a plurality of circumferentially spaced inwardly projecting lugs; a series of anti-friction balls interposed between and engaging the opposed surfaces of said base member wall and said horizontal portion of the cap member, adjacent said annular flange; a circular cage member engaging and circumferentially spacing said balls, said cage member being disposed between the cap and base members with its periphery adjacent said flange and engaged by said projecting lugs thereof whereby to prevent displacement of the cage member and balls from the cap member; a handle detachably keyed to the cap member, said handle having a stem extending through the sleeve of such member and through the aperture in the top wall of the base member; means readily detachably engaging said stem beneath said base member wall for retaining the handle, cap member and base member in assembled relation; and a plurality of comestible receiving receptacles each detachably secured to said cap member.

3. A readily knocked-down and assembled rotatable table caster, comprising a base member having a horizontal top wall the central portion of which is provided with an aperture; a cap member rotatably superposed upon said base member, said cap member including a horizontal crown and a peripheral side wall depending therefrom, the lower portion of such side wall being provided with a horizontal annular ledge disposed in vertically spaced relation to said base member top wall, and said crown of the cap member having a central depression and a depending bearing sleeve alined therewith; a series of anti-friction balls disposed between and engaging the opposed surfaces of said base member wall and said cap member ledge; a handle surmounting the cap member and having a stem removably disposed in said bearing sleeve and projecting through said base member aperture; said handle being provided with a boss seated in and keyed to said depression in the crown of the cap member to prevent relative rotation between such member and the handle; readily removable means engaging said handle stem beneath said base member wall to retain the handle, cap member and base member in assembled relation; and a plurality of comestible receiving receptacles each readily detachably engaged with and supported by the side wall and ledge of said cap member respectively.

RUDOLPH BERNHARDT.

References Cited in the file of this patent

UNITED STATES PATENTS

| Number | Name | Date |
|---|---|---|
| D. 102,967 | Daum | Jan. 26, 1937 |
| D. 166,442 | Black | Apr. 15, 1952 |
| 76,211 | Libby | Mar. 31, 1868 |
| 137,248 | Shaw | Mar. 25, 1873 |
| 141,390 | Sheldon | July 29, 1873 |
| 429,893 | Dahlstrom | June 10, 1890 |
| 554,661 | Doolittle | Feb. 18, 1896 |
| 982,351 | Cree et al. | Jan. 24, 1911 |
| 1,718,015 | Weidner | June 18, 1929 |
| 2,091,394 | Park | Aug. 31, 1937 |
| 2,446,629 | Brown et al. | Aug. 10, 1948 |

FOREIGN PATENTS

| Number | Country | Date |
|---|---|---|
| 2,381 | Austria | Oct. 10, 1900 |